US007002976B2

(12) United States Patent
Dupont

(10) Patent No.: US 7,002,976 B2
(45) Date of Patent: Feb. 21, 2006

(54) VIRTUAL ETHERNET PORTS WITH AUTOMATED ROUTER PORT EXTENSION

(75) Inventor: Jean-Lou Dupont, Saint Laurent (CA)

(73) Assignee: Marconi Intellectual Property (Ringfence) Inc., Warrendale, PA (US)

( * ) Notice: Subject to any disclaimer, the term of this patent is extended or adjusted under 35 U.S.C. 154(b) by 1205 days.

(21) Appl. No.: 09/817,982

(22) Filed: Mar. 27, 2001

(65) Prior Publication Data

US 2002/0141421 A1   Oct. 3, 2002

Related U.S. Application Data

(60) Provisional application No. 60/244,991, filed on Nov. 1, 2000.

(51) Int. Cl.
*H04L 12/28* (2006.01)
*H04L 12/56* (2006.01)

(52) U.S. Cl. .................................... 370/404; 370/466
(58) Field of Classification Search ........ 370/400–405, 370/395.5–395.54, 466, 389, 392; 709/249, 709/251, 230
See application file for complete search history.

(56) References Cited

U.S. PATENT DOCUMENTS

| 6,498,794 | B1 * | 12/2002 | Tsukamoto et al. ...... 370/395.1 |
| 6,639,893 | B1 * | 10/2003 | Chikenji et al. ............ 370/217 |
| 6,647,428 | B1 * | 11/2003 | Bannai et al. .............. 709/245 |
| 2002/0027905 | A1 * | 3/2002 | Heuer ........................ 370/386 |

FOREIGN PATENT DOCUMENTS

EP   0924901   6/1999

OTHER PUBLICATIONS

Chan Park et al., "The Operation of an IP and Address Resolution Over the ATM LAN Interworking Unit", Broadband Communications Department, Electornics and Telecommunications Research Institute, pp. 444-448.
Hiroyuki Fujita et al., "SONET Fiber-Optic Transmission Systems", Hitachi Review, 44(1995), Aug. No. 4, Tokoy, Japan, pp. 187-192.
Puritscher, Norbert, "Der Direkte Draht Zum Kunden", Telekom-Technik, , XP-000723934, 1997, pp. 60-61.

* cited by examiner

*Primary Examiner*—Ajit Patel
(74) *Attorney, Agent, or Firm*—Jones Day

(57) ABSTRACT

A method and system for extending a plurality of subinterfaces of a router port of a wide area network access device to a plurality of user networks using a transport network is provided. The transport network comprises a plurality of network nodes coupled together by one or more data communication paths wherein at least one of the network nodes comprises an access device. The access device includes a plurality of router port extension functional units wherein each router port extension functional unit is coupled to one of the user networks. Each router port extension functional unit comprises a virtual channel agent and a LAN agent. Each router port extension functional units has an associated virtual port, and all of the virtual ports are multiplexed to a single LAN communication port. The method comprises the steps of receiving a first upstream data packet from a first user LAN, decapsulating the received first data packet so that the LAN encapsulation format is removed from said received first data packet, encapsulating the first decapsulated data packet into the transport network encapsulation format, transmitting the first transport network encapsulated data packet onto the transport network, and repeating the foregoing steps with a second user LAN using a second router port extension functional unit.

56 Claims, 7 Drawing Sheets

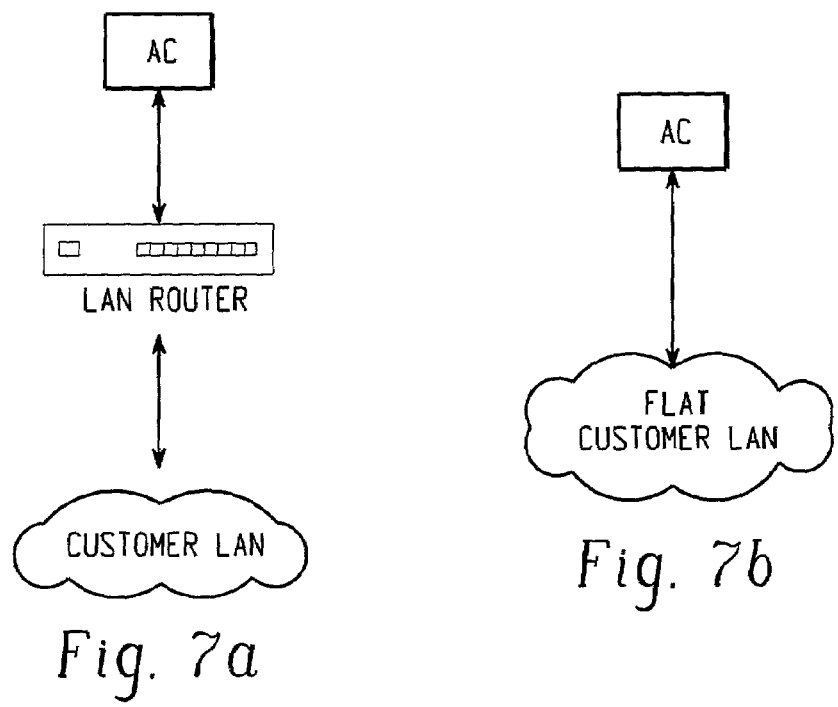
Fig. 7a
Fig. 7b
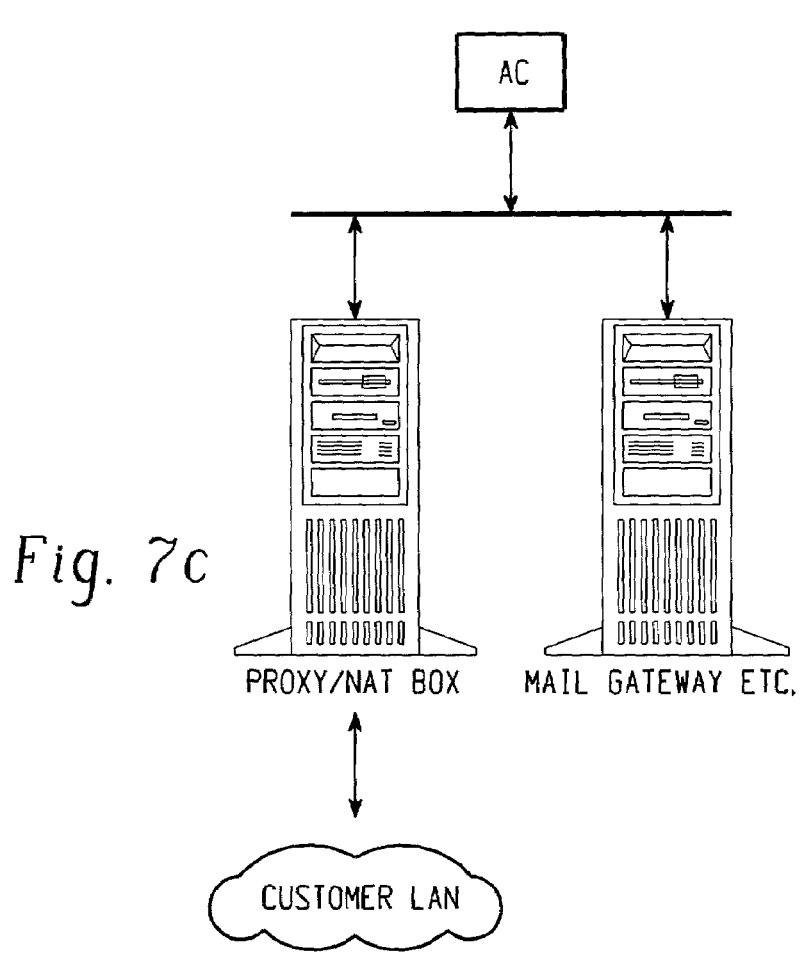
Fig. 7c

VIRTUAL ETHERNET PORTS WITH AUTOMATED ROUTER PORT EXTENSION This application claims the benefit under 35 U.S.C. § 119(e) to U.S. Provisional Patent Application No. 60/244,991 entitled "Virtual Ethernet Ports With Automated Router Port Extension" and filed on Nov. 1, 2000, now abandoned. This application also incorporates U.S. Provisional Patent Application No. 60/244,991 by reference as if fully rewritten here.

BACKGROUND OF THE INVENTION

1. Field of the Invention

The present invention is directed toward the field of data communication networks. In particular, the invention is directed to a system and method for providing a high-speed interface between a user and a wide area network.

2. Description of the Related Art

Many computer users have found that there are many advantages to linking computers together through a local area network ("LAN"). The most common type of LAN used is the Ethernet. The use of a LAN allows multiple users, among other things, to share programs, files, data, and to communicate using methods such as e-mail.

With the growth of the internet, many computer users have also found that there are many advantages to having access to the internet or some other wide area network ("WAN"). An early option for providing WAN access was the provision of a separate communication channel to the outside world for each computer seeking WAN access. Modems and telephone lines are typically used with this option. When using this method, for example, a computer seeking internet access would gain internet access through an Internet Service Provider ("ISP") via the computer's dedicated modem and telephone line. The ISP would complete the internet connection by providing the computer with access to one of the ISP's internet router ports on a shared basis with other users. This access method, however, is highly inefficient, slow and expensive, particularly for computers linked together via a LAN.

To improve upon the earlier access methods, LAN administrators have provided computers with WAN access through non-dedicated communication channels so that resources such as modems and telephone lines, could be shared and, as a result, used more efficiently. To further improve access, the use of higher speed access media to the ISP, such as the use of DSL lines or fiber optic connections, have been proposed. The use of these higher speed access media, however, could make the cost of access for the users quite expensive. Wireless interfaces or dial-up modems could be used to reduce costs but these access means would yield a much slower connection.

Therefore, there remains a need in this art for a high speed, low cost system for providing WAN access to multiple users. There remains a more particular need for a high speed, low cost system for providing WAN access having an interface that is not complex for the user to implement.

SUMMARY OF THE INVENTION

The present invention further improves upon the access methods noted above and provides a high speed, low cost system and method for providing access to a wide area network. The present invention provides a system that utilizes a high speed communication network to provide a user with high speed access to a WAN access device. The high speed communication network is capable of providing multiple users or LANs with a high speed data communication path to a WAN access device via a high speed access medium, such as a fiber optic network, on a shared basis so that the cost per user for use of the high speed data communication path to the WAN access device is reduced. The system includes an access engine that adds value to the operational aspects of bringing up the high speed internet connection. The access engine provides an extended router port at the user's interface to the system thereby minimizing interface complexities for the user, the WAN access service provider, and the carrier that provides the high speed communication network.

The present invention provides many advantages over the presently known communication systems for providing WAN access. Not all of these advantages are simultaneously required to practice the invention as claimed, and the following list is merely illustrative of the types of benefits that may be provided, alone or in combination, by the present invention. These advantages include: (1) the use of a high speed communication system such as a fiber optic network or SONET/SDH network to transmit data between the user equipment and the WAN access device; (2) connecting multiple users to the WAN access device thereby reducing the cost per user for the high speed access to the WAN device; (3) providing a system in which the user does not have to reconfigure its equipment in order to send or receive data packets that are transmitted over a fiber optic or SONET/SDH network; (4) providing a system in which the WAN access device does not have to be reconfigured to send data packets that are compatible with a user's communication protocol; and (5) increasing the 'fan-in' capacity of Ethernet interfaces to admit more customers to 'share' Internet access and providing an efficient way of providing Internet access to a multitude of customers through an Ethernet interface using the Automated Router Port Extension.

In accordance with one aspect of the present invention a communication system is provided that provides a plurality of user networks with a high speed link to a wide area network. The system comprises a transport network having a plurality of network nodes coupled together by one or more data communication paths, wherein at least one of said network nodes comprises an access device and at least one of said network nodes comprises a concentrator device. The access device includes a plurality of router port extension functional units wherein each router port extension functional unit is coupled to one of the user networks. The router port extension functional unit are operable to receive an upstream data packet from one of the user networks, operable to frame the received upstream data packet into a format compatible for transmission on the transport network, and operable to forward the converted upstream data packet onto at least one of the data communication paths on the transport network. The router port extension functional unit also is operable to receive a downstream data packet from at least one of the data communication paths on the transport network, operable to frame the received downstream data packet into a format compatible for receipt by the user network, and operable to forward the converted downstream data packet to the user network. The concentrator device is coupled to a wide area network access device. The concentrator device is operable to receive network data packets from at least one of said data communication paths and operable to forward the received network data packets to the wide area network access device. The concentrator device is also operable to receive data packets from the wide area network access device and operable to forward the data packets from said wide area network access device to at least one of said data communication paths.

In one embodiment, each router port extension functional unit has an associated virtual port and all of the virtual ports are multiplexed to a single LAN communication port. In another embodiment the system includes a LAN switch device. The LAN switch device includes a first port for providing a coupling path to the LAN communication port of said access device. The LAN switch also includes a plurality of customer LAN ports wherein each of the customer LAN ports is operable to provide a coupling point for a connection between one of the user LANs and one of the router port extension functional units.

In accordance with another aspect of the present invention, a network node device for use in a transport network and for providing a plurality of user networks with an interface to the transport network is provided. The network node device comprises a plurality of router port extension functional units. Each router port extension functional unit is coupled to one of the user networks. Each router port extension functional unit comprises a virtual channel agent and a LAN agent. The virtual channel agent is operable to receive a first data packet from the transport network and is operable to transmit a second data packet to the transport network. The LAN agent is operable to receive the second data packet from the user network and is operable to transmit the first data packet to the user network.

In accordance with another aspect of the present invention, a method for extending a plurality of sub-interfaces of a router port of a wide area network access device to a plurality of user networks using a transport network is provided. The transport network comprises a plurality of network nodes coupled together by one or more data communication paths wherein at least one of the network nodes comprises an access device. The access device includes a plurality of router port extension functional units wherein each router port extension functional unit is coupled to one of the user networks. Each router port extension functional unit comprises a virtual channel agent and a LAN agent. Each router port extension functional units has an associated virtual port, and all of the virtual ports are multiplexed to a single LAN communication port. The method comprises the steps of receiving, with the virtual channel agent of a first router port extension functional unit, a downstream data packet from the router port; decapsulating, in the first router port extension functional unit, the received downstream data packet so that the transport network encapsulation format is removed from the received data packet; transmitting, with the LAN agent of the first router port extension functional unit, an ARP-like message over a first user LAN requesting the address for the recipient of the received downstream data packet; receiving, with the LAN agent of the first router port extension functional unit, an ARP-like response from a device on the first user LAN; encapsulating, in the first router port extension functional unit, the decapsulated data packet into a LAN encapsulation format data packet using the address received from the ARP-like response as the destination address for the data packet; transmitting, with the LAN agent of the first router port extension functional unit, the LAN encapsulated data packet onto said first user LAN; and repeating the foregoing steps using a second user LAN and a second router port extension functional unit.

In accordance with another aspect of the present invention, a method for extending a plurality of sub-interfaces of a router port of a wide area network access device to a plurality of user networks using a transport network is provided. The transport network comprises a plurality of network nodes coupled together by one or more data communication paths wherein at least one of the network nodes comprises an access device. The access device includes a plurality of router port extension functional units wherein each router port extension functional unit is coupled to one of the user networks. Each router port extension functional unit comprises a virtual channel agent and a LAN agent. Each router port extension functional units has an associated virtual port, and all of the virtual ports are multiplexed to a single LAN communication port. The method comprises the steps of receiving, with the LAN agent of a first router port extension functional unit, a first upstream data packet from a first user LAN; decapsulating, in the first router port extension functional unit, the received first data packet so that the LAN encapsulation format is removed from said received first data packet; encapsulating, in the first router port extension functional unit, the first decapsulated data packet into the transport network encapsulation format; transmitting, with the virtual channel agent of the first router port extension functional unit, the first transport network encapsulated data packet onto the transport network; and repeating the foregoing steps with a second user LAN using a second router port extension functional unit.

BRIEF DESCRIPTION OF THE DRAWINGS

The present invention will become more apparent from the following description when read in conjunction with the accompanying drawings wherein:

FIGS. 7a, 7b, and 7c are schematic illustrations of alternate LAN configurations that can be used with the present invention;

DETAILED DESCRIPTION OF THE PREFERRED EMBODIMENT

System Description

Figure 1:
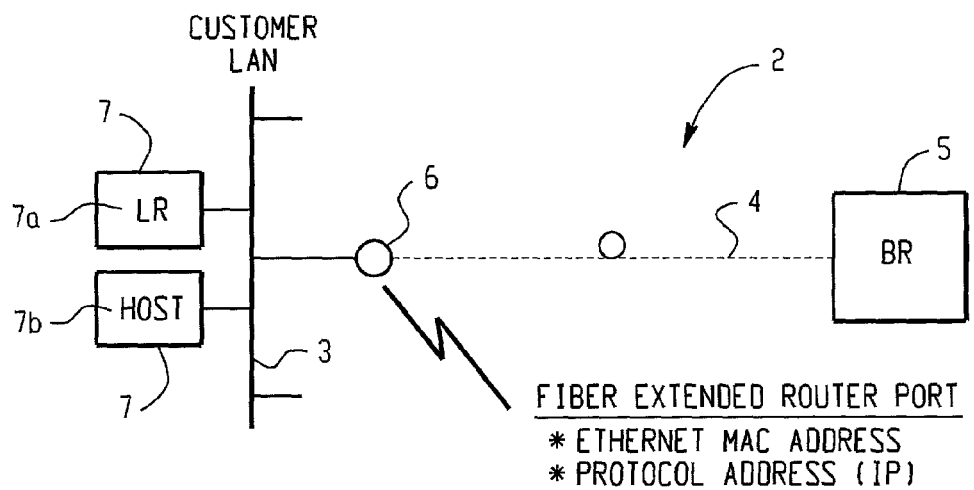
FIG. 1 is a schematic drawing of a communication system that provides a fiber extended router port.

Referring now to the drawings, FIG. 1 sets forth a schematic drawing of a preferred embodiment of a communication system 2 according to the present invention. The communication system 2 provides a user or a user's local area network 3 ("LAN") with access to the internet or some other wide area network ("WAN"). In the embodiment shown, a LAN 3 is provided with internet access through a fiber optic system 4. The fiber optic system 4 provides a connection between the user LAN 3 and an internet access device such as an internet backbone router 5 ("BR"). The BR 5 has a number of ports (not shown) with internet protocol ("IP") addresses assigned thereto. Internet access is achieved through accessing the ports on the BR 5.

The present invention simplifies the access by providing a fiber extended router port 6. To the LAN 3, an assigned port from the BR 5 is made to appear to be physically located at the LAN's interface 6 with the fiber optic system 4. The provision of this fiber extended router port 6 at the LAN's interface, thereby, simplifies the interface requirements for devices 7 on the LAN 3 such as a LAN router ("LR") 7a or a LAN Host ("Host") 7b. With the present invention, the LAN devices 7 communicate with the fiber extended router port 6 using their existing LAN protocol. The LAN devices 7 aren't required to change the format they use locally on the LAN to exchange data nor do they need additional programming in order to transmit data packets to or receive data packets from the BR 5 even though a portion of the communication path the data must travel includes fiber optic networks multiplexers and other devices. In addition, with the present invention, the interface for the internet access device 5 is not made more complex. The internet access device 5 will not require modification or additional programming to accommodate the various data packet formats used on the various LANs the internet access device 5 may provides internet access for.

The preferred user LAN 3 is an Ethernet LAN but other LAN types such as token ring, FDDI, etc., could be used. LAN Hosts 7b preferably are personal computers ("PCs") but optionally could be servers or other computer or communication equipment. LAN router 7a preferably comprises computer or communication hardware that forwards data from or to other computer or communication equipment on the LAN 3. LAN router 7a optionally could be coupled to other subnets (not shown) on the user's premises which interconnect other LAN hosts (not shown).

Figure 2:
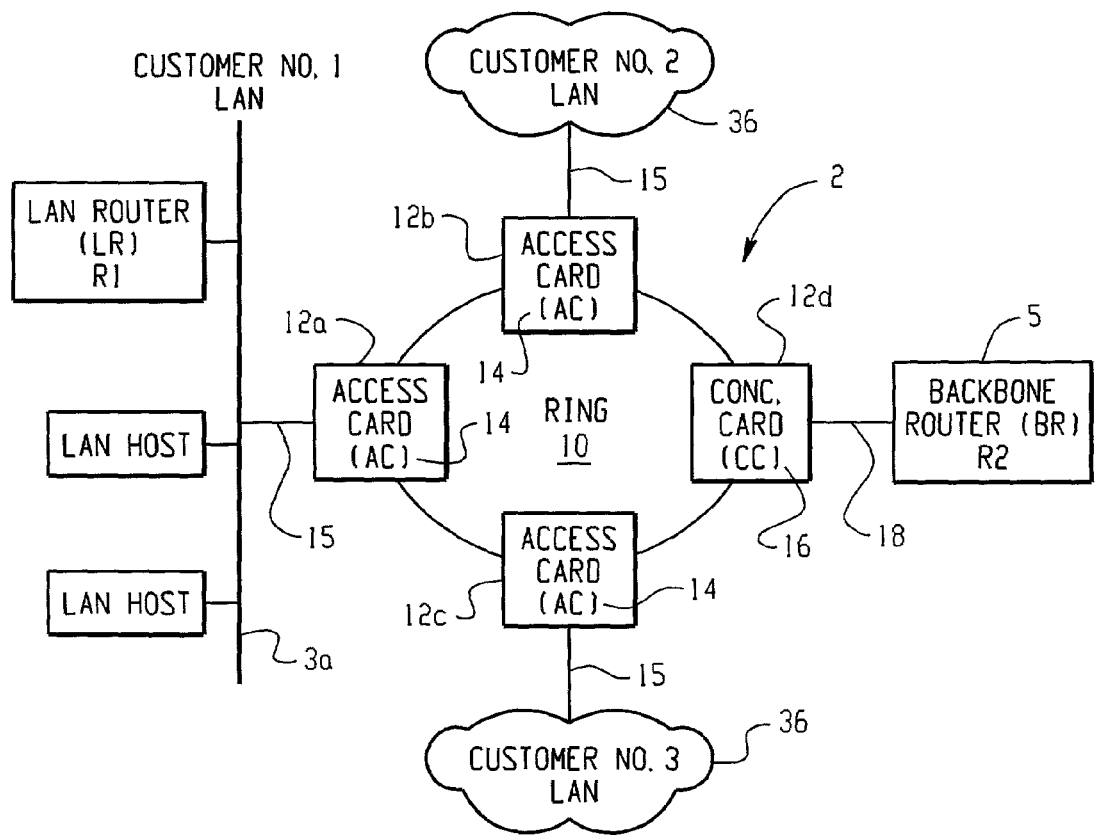
FIG. 2 is a more detailed schematic drawing of a communication system that provides multiple LANs with access to a WAN.

FIG. 2 sets forth a more detailed view of an exemplary communication system 2 for providing a plurality of user LANs 3 with access to the internet or other WAN via a fiber optic system. The exemplary communication system 2 includes a fiber optic system that preferably is arranged in a ring network 10 and more preferably in a Synchronous Optical Network ("SONET") or SDH ring. The communication system 2 also includes a plurality of network nodes 12a, 12b, 12c, & 12d that are coupled together in the SONET/SDH ring 10, a plurality of local or user LANs 3a, 3b & 3c that are coupled to the network nodes 12a, 12b & 12c, respectively, preferably via fiber optic cables 15, and an internet or WAN access device 5 such as an internet backbone router ("BR") coupled to network node 12d.

Figure 3:
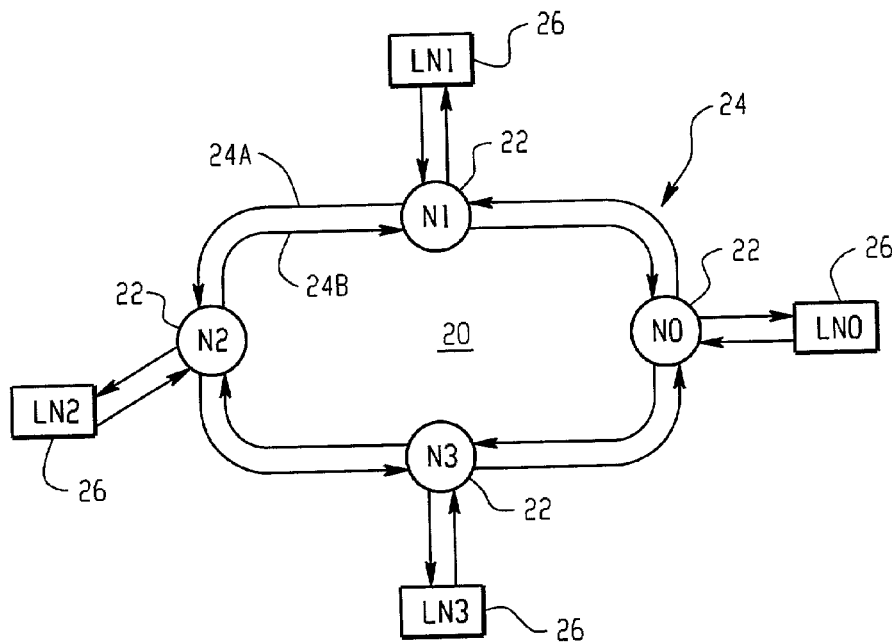
FIG. 3 is a schematic drawing of a ring network used in a preferred embodiment of the invention.

FIG. 3 sets forth a system diagram of a preferred SONET/SDH ring 20 for use in a communication system that practices the present invention. The SONET/SDH ring 20 includes a plurality of network nodes 22, labeled N0–N3, coupled in a ring structure by one or more communication paths 24A, 24B. As shown in FIG. 3, the two paths 24A, 24B transport SONET/SDH data streams (many packets/cells) in opposite directions about the ring (i.e., east and west). The communication paths 24A, 24B are preferably fiber optic connections (in SONET/SDH), but could, alternatively be electrical paths or even wireless connections (in other types of ring networks). In the case of a fiber optic connection, paths 24A, 24B could be implemented on a single fiber 24, on dual fibers 24A, 24B, or some other combination of connections. Each network node 22 is preferably coupled to two other network nodes 22 in the ring structure 20. For example, network node N0 is coupled to network nodes N1 and N3. The coupling between the nodes in FIG. 1 is two-way, meaning that each node 22 transmits and receives data (packets/cells) to and from each of the two other nodes 22 to which it is connected. Each network node 22 includes at least two transmitter/receiver interfaces, one for each connection to another node 22. The network nodes 22 could be many types of well-known network devices, such as add-drop multiplexers ("ADMs"), switches, routers, cross-connects or other types of devices. The devices 22 shown in FIG. 3 are preferably ADMs. An ADM is a three terminal device having a local add/drop interface, an upstream network node interface, and a downstream network node interface. These ADMs 22 are coupled to local nodes 26, and are used to add packets/cells from the local nodes 26 to the SONET/SDH data stream, and conversely to drop packets from the SONET/SDH data stream to the local nodes 26. A system and method for packet transport in a SONET/SDH ring network and an exemplary ADM is described in more detail in commonly-assigned U.S. patent application Ser. No. 09/378,844 ("the '844 application), which is incorporated herein by reference. For more information on SONET/SDH formats, line-speeds, and theory of operation, see John Bellamy, *Digital Telephony*, 2d Edition (1991), pp. 403–425.

The network nodes 22 shown in FIG. 3 may be logically connected by a plurality of virtual paths that coexist on the physical network connection(s) 24. Virtual paths are also known as logical paths or "pipes." For example, although there is only one physical connection from node N0 to node N1 to node N2, there may be numerous virtual paths between these nodes, such as one virtual path from N0 to N1, another from N0 to N2 and another from N1 to N2. Each virtual path may include a plurality of virtual channels, wherein each virtual channel transports packets (or cells) formatted according to the SONET/SDH SPE. The use of virtual paths in SONET/SDH ring networks is described in more detail in commonly-assigned U.S. patent application Ser. No. 09/324,244 ("the '244 application"), which also is incorporated herein by reference.

In the exemplary communication system 2 shown in FIG. 2, the network nodes 12a, 12b & 12c are access nodes. The network devices that make up access nodes 12a, 12b & 12c each include an access device or access card ("AC") 14. Each access card 14 is operable to transfer data packets between a user's equipment on a LAN 3 and other nodes 12 on the ring network 10. The access cards 14 of the present invention may physically reside within a network device of the SONET/SDH ring 10 or alternatively may be coupled to a network device.

The network node 12d of the exemplary communication system 2 is an internet gateway node and the network device that makes up the gateway node 12d includes a multiplexor device or concentrator card ("CC") 16. The CC 16 functions as a switch that multiplexes data packets transmitted by the access nodes 12a, 12b & 12c onto a single data transmission channel 18 for further routing to the internet access device 5. The CC 16 also functions as a switch for forwarding data packets received over the data transmission channel 18 from the internet access device 5 to one or more access nodes 12a, 12b or 12c.

Router ports are also very expensive. Because of the expense and high bandwidth capability, router ports have been configured for shared use between multiple virtual circuits and sub-interfaces. The concentrator card 16 facilitates the shared use of a router port and has a twofold role.

The concentrator card 16 merges the data from the various LANs 3 and access cards 14 on the ring network into a single pipe for forwarding to the single router port of the BR 5 to which the concentrator card 16 is coupled. In merging the data, the concentrator card 16 couples the data to different interfaces within the router port. The concentrator card's 16 second task is to take data from the BR 5, packet by packet, and forwards the data to the various access nodes 12 on the ring network.

Protocol Engine

Figure 4:
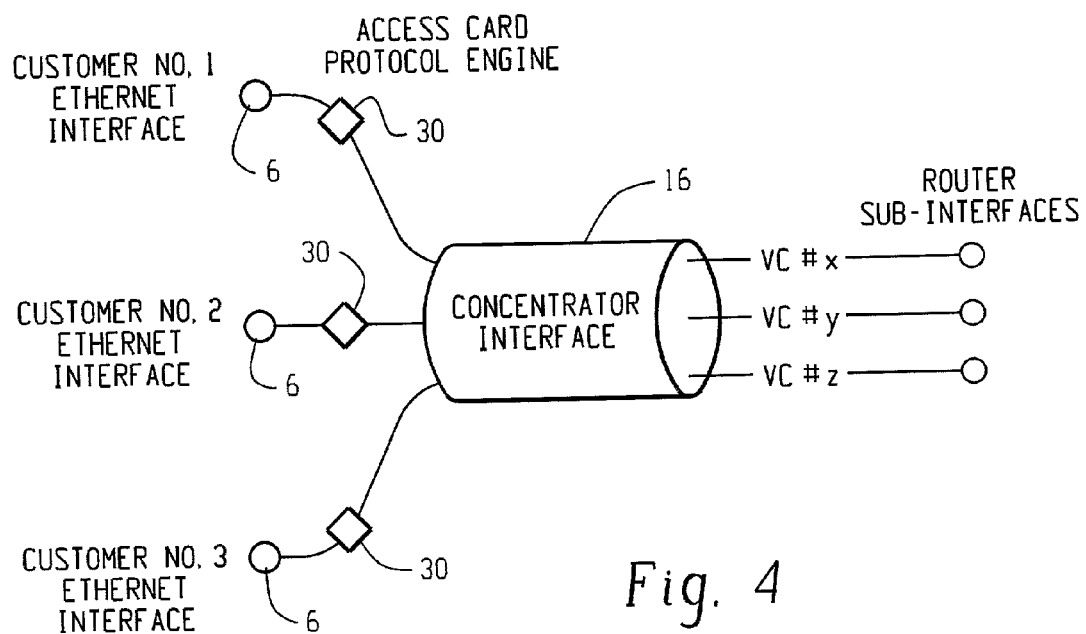
FIG. 4 is an alternate view of a communication system that provides multiple LANs with access to a WAN.

Each access card 14 includes at least one protocol engine 30, as shown in FIG. 4, for providing a fiber extended router port 6 to a LAN 3. The protocol engine 30 provides a permanent address for use by the LAN devices 7 when transmitting data packets to the WAN. The protocol engine 30 reformats data packets from the LAN devices 7 and transmits the reformatted data packets over the ring 10 through the concentrator interface of CC 16 to a sub-interface of BR 5. The protocol engine 30 also receives data packets from a sub-interface of BR 5 through the concentrator interface and reformats those data packets to the format used on the LAN 3. The protocol engine 30 addresses at least three main architectural issues: encapsulation, maximum transfer unit ("MTU"), and address resolution.

Figure 5:
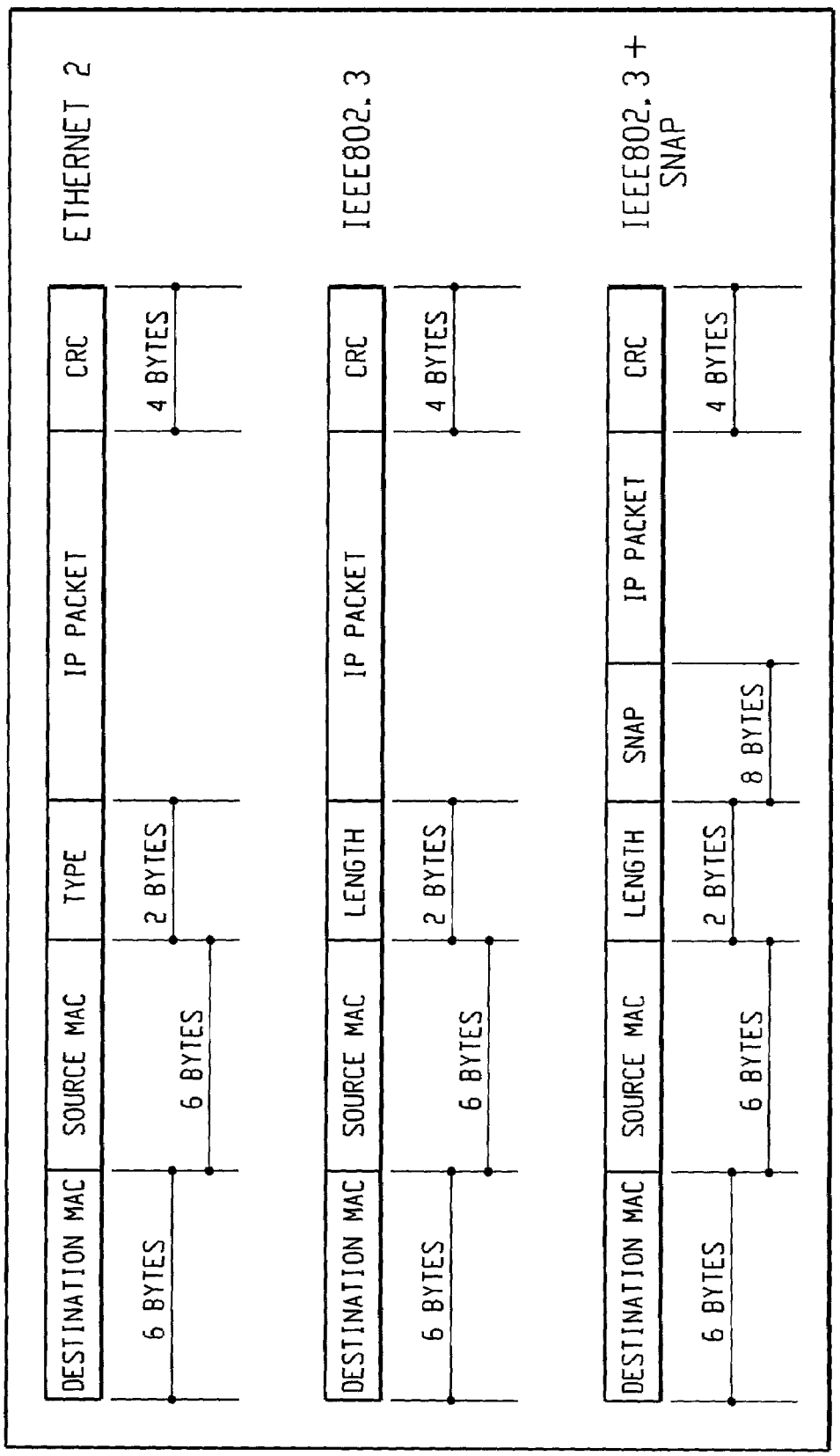
FIG. 5 is a diagram illustrating multiple Ethernet data framing formats.

On a user LAN 3, a number of different data formats could be used for framing the data packets traveling across the user LAN. For example on an Ethernet LAN, framing formats such as the Ethernet 2, the IEEE802.3, the IEEE802.3+SNAP, or others could be used, as illustrated in FIG. 5. The protocol engine 30 simplifies the interface between an internet gateway device 5 and LAN devices 7 by handling the data encapsulation needed to transfer data between them. The protocol engine 30 makes the interface requirements for an internet gateway device 5 less complex by framing data packets from the gateway device 5 into the data framing format used on the user LAN 3 so that the gateway device 5 does not have to perform this function. The protocol engine also makes the interface for the LAN devices 7 less complex by performing the data packet framing and de-framing necessary for sending data over and receiving data from a SONET/SDH ring 10.

A preferred way in which the protocol engine 30 handles the encapsulation of data traveling to and from the user LAN 3 is by being liberal in what the protocol engine 30 accepts as Ethernet frames and by being conservative in how the protocol engine 30 forwards Ethernet frames. For example, the protocol engine 30 can accept all Ethernet encapsulation types from the user LAN 3 and only provide one encapsulation type to the user LAN 3.

MTU becomes an issue when data is transferred between different networks. The maximum data packet size for each network may differ. For example, Ethernet 2 encapsulation allows for 1500 octets of data packets and IEEE 802.3 SNAP networks are limited to 1492 octets. The protocol engine 30 is capable of handling messages received from the BR 5 that are too big for the destination user LAN 3.

The protocol engine 30 has two options when the MTU of the BR 5 exceeds the MTU of the user LAN 3. Preferably, when a data packet received from the BR 5 is too large and cannot be encapsulated into a frame for the user LAN 3, the protocol engine 30 will fragment the IP datagram to make it conform to the Ethernet layer framing, i.e., divide the data packet into smaller chunks that can be encapsulated into frames for transmission to the user LAN 3. Optionally, the protocol engine 30 can make use of the ICMP 'Datagram Too Big' message. Under this approach, if a data packet is received that is too large, the protocol engine 30 discards the entire data packet and returns an ICMP 'Datagram Too Big' message to the source of the data packet. The protocol engine 30 analyzes the 'DF' bit ("Don't Fragment") in the data packet header to determine whether this is the preferred action to take.

Address Resolution is another task that the protocol engine 30 undertakes to simplify the interface between an internet gateway device 5 and LAN devices 7. When encapsulating data packets transmitted to the user LAN 3, the protocol engine 30 encapsulates the data packets in an Ethernet frame having the proper source & destination MAC addresses. The source MAC address is fixed to the one associated with the protocol engine 30. The destination MAC address is dynamically resolved. For unicast data packets, the protocol engine 30 preferably uses the ARP process.

Figure 6:
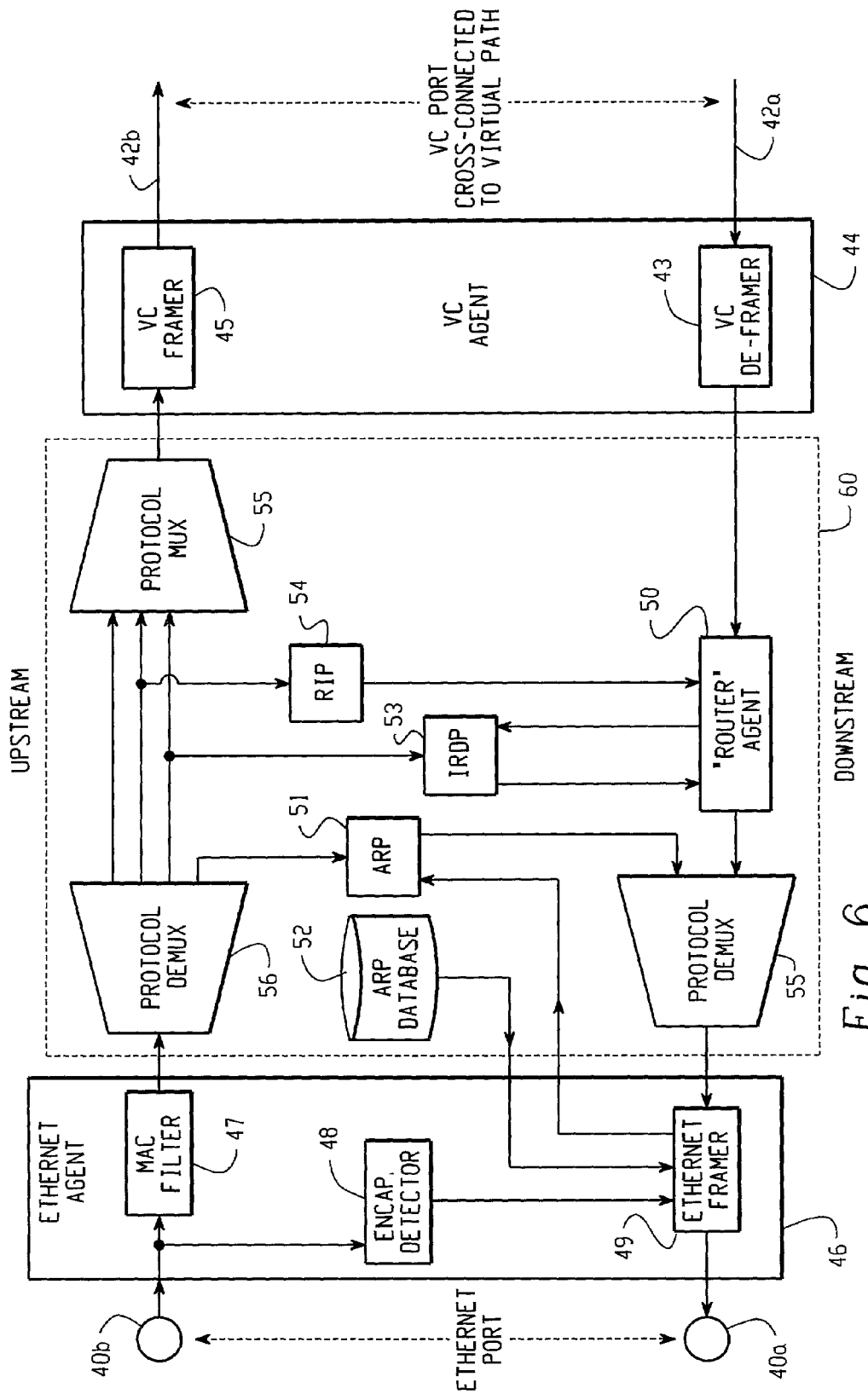
FIG. 6 is a schematic drawing of a preferred Protocol engine.

A preferred implementation of the protocol engine 30 is shown in FIG. 6. The preferred protocol engine 30 includes a user LAN port 40 for interfacing with the user's LAN and a virtual channel port 42a & 42b for interfacing with the ring network 10 and completing the virtual path between the router 5, concentrator card 16, and access card 14. The LAN port 40 is the fiber extended router port 6 of the present invention. The preferred LAN port 40 has an Ethernet transmit data port connection 40a and an Ethernet receive data port connection 40b. The protocol engine 30 also has a downstream path and an upstream path for transferring data. In the downstream data path, data flows downstream from the backbone router 5 through the ring network 10 through the protocol engine 30 in the access card 14 to the user LAN 3. In the upstream data path, data flows from the user LAN 3 through the protocol engine 30 through the ring network 10 to the backbone router 5.

The preferred protocol engine 30 also comprises a Virtual Channel ("VC") agent 44 and an Ethernet Agent 46. These two agents convert data packets traveling downstream in the SONET/SDH format to the Ethernet data format used on the LAN. These two agents also convert Ethernet data packets traveling upstream from the LAN to a SONET/SDH data format.

In particular, the VC Agent 44 is responsible for performing the functions required to transmit data to and to receive data from a virtual channel. The preferred VC Agent 44 comprises a VC de-framer 43 and a VC framer 45. The VC De-framer 43 is responsible for removing the overhead that is added to a data packet that has been framed or encapsulated to travel over a SONET/SDH ring. The VC Framer 45, on the other hand, is responsible for encapsulating or adding overhead to data packets that are going upstream over a SONET/SDH ring.

The preferred Ethernet Agent 46 performs the required functions to comply with a standard IEEE802.3 Ethernet Port such as preamble generation/detection, FCS generation/detection, frame length checking, etc. The preferred Ethernet Agent 46 comprises a MAC Filter 47, an Encapsulation Detector 48, and an Ethernet Framer 49. The MAC filter 47 filters Ethernet messages passing over the user LAN based on the destination MAC address in each Ethernet packet. The MAC filter 47 only accepts packets destined to the MAC address associated with the protocol engine 30 and broadcast/multicast packets. The encapsulation detector 48 detects the encapsulation format used on the LAN 3 and instructs the Ethernet framer 49 on which encapsulation format to use when sending out packets. The Ethernet Framer 49 constructs the Ethernet frame surrounding the IP packet to be sent out of the protocol engine 30 onto the LAN 3.

The preferred protocol engine 30 also includes a router port extension 60 that includes a router agent 50. The router agent 50 performs a limited routing function such as the ARP table function and IRDP snooping, etc. The preferred protocol engine 30 does not perform routing table computation When the LAN 3 includes a LAN router 7a, the router agent forwards all packets received by the protocol engine 30 that are not directly addressed to a LAN host 7b to the LAN router 7a.

The router port extension 60 in the preferred protocol engine 30 also includes an address resolution protocol agent 51 ("ARP") and an ARP database 52. The ARP agent 51 initiates 'ARP request' Ethernet broadcast messages for populating the ARP database 52 and responds to Ethernet 'ARP request' broadcast messages with 'ARP replies' Ethernet messages when asked to perform binding for the IP address associated with the protocol engine's 30 Ethernet port. The ARP database 52 houses the Ethernet MAC address to IP address mapping table for devices 7 on theLAN3.

The router port extension 60 in the preferred protocol engine 30 includes an IRDP ("ICMP Router Discovery Protocol") agent 53. (ICMP refers to "Internet Control Message Protocol.") The IRDP Agent snoops the protocol 'ICMP Router Advertisement' message. When this message is required from the upstream interface 40b, the IRDP agent 53 is alerted of the availability of a LAN router 7a on the LAN 3, and passes this information on to the router agent 50. When an ICMP Router Advertisement message is received from the downstream interface 42a (from the backbone router 5), the IRDP agent is informed of the IP address assigned to the protocol engine 30 by BR 5.

The router port extension 60 in the preferred protocol engine 30 further includes a RIP (Routing Information Protocol) agent 54 which snoops messages from the upstream interface 40b. When a RIP message is snooped, the RIP agent 54 is informed of the availability of a LAN router 7a on the LAN 3, which the RIP agent 54 passes on to the router agent 50.

The router port extension 60 in the preferred protocol engine 30 also includes protocol muxes 55 and a protocol demux 56. The protocol mux multiplexes packets from different protocol agents. The protocol demux 56 demultiplexes packets from the Ethernet input stream and sends them to the appropriate agents within protocol engine 30. In particular, ARPs, RIPs & IRDP packets are snooped from the input and copies are sent to the appropriate agents inside the protocol engine 30.

The operation of the preferred protocol engine 30 will be described next. The VC port 42 is connected through a virtual path to the concentrator card 16, and the concentrator card 14d is coupled to the internet access device or backbone router 5. In the downstream direction, the backbone router 5 transmits IRDP messages that are received by the protocol engine 30. Through IRDP messages, the backbone router 5 advertises the IP address that it has assigned to a virtual channel ("VC"). The protocol engine 30 listens to or snoops the IRDP messages for the IP address assigned to its VC and uses that address. The protocol engine 30 has a uniquely assigned IEEE Ethernet MAC address assigned by the manufacturer.

Since the protocol engine 30 has both a MAC address and an IP address, it can function as an Ethernet router port on the LAN 3. To send a message over the internet, a LAN device 7 sends an Ethernet data packet having an IP data packet embedded therein addressed to the protocol engine 30 using the protocol engine's MAC address. The protocol engine 30 then frames the data to a format for transmission over the optical ring network 10 and forwards the IP packet through its assigned VC to the backbone router 5.

To determine the protocol engine's MAC address, the host 8 can broadcast an ARP message over the LAN to the LAN's gateway IP address. The protocol engine, since it occupies the gateway IP address, sends an ARP reply message with its MAC address. The LAN device 7 remembers the protocol engine's MAC address for future routing of IP data packets.

Through the use of the present system, the backbone router 5 does not need to know the Ethernet addresses of a LAN host 7b to send IP data packets to it. The backbone router 5 merely sends data packets to virtual channels. The protocol engine 30 then forwards the IP data packet sent to its virtual channel to the proper recipient LAN host 7b. The protocol engine 30 binds the MAC addresses on the LAN 3 and the IP addresses that are coming down from the backbone router 5.

Figure 8:
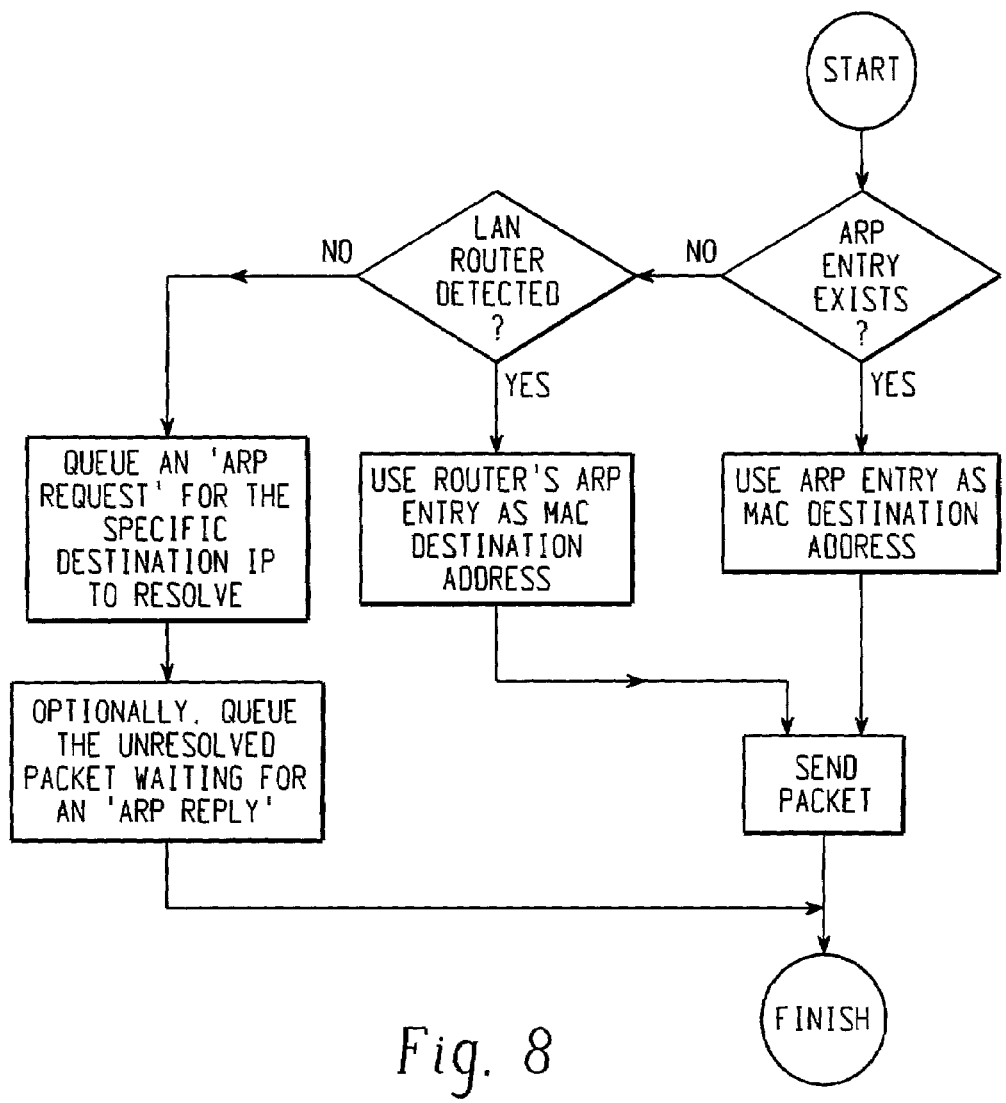
FIG. 8 is a flow chart illustrating a preferred process of downstream packet processing.

When an IP packet coming downstream from the backbone router 5 to the LAN 3 is received by the protocol engine 30, the protocol engine 30 de-frames the data packet to strip off the overhead from the optical ring network transmission and frames the data packet as an Ethernet data packet addressed to a host's MAC address on the LAN. FIG. 8 illustrates the process the protocol engine 30 performs to determine the MAC address to send the data packet to. If the protocol engine 30 does not know the recipient's MAC address, the protocol engine 30 issues an ARP request over the LAN 3 for the MAC address of the recipient host. The proper host 7b replies with its MAC address. That MAC address is stored in the ARP database. In one implementation, the protocol engine 30 then frames the IP packet as an Ethernet packet and transmits the packet to the MAC address associated with the recipient host. In another implementation, the protocol engine 30 discards the original data packet and awaits the retransmission of the data packet before it frames the IP packet and transmits it. In cases where no recipient responds to the ARP request, the protocol engine 30 optionally may send the packet to the LAN router 7a, if one exists.

To determine the IP protocol address and MAC address of the LAN router on the user LAN 3, the protocol engine 30 uses the source IP and MAC addresses in the RIP advertisement message and/or the IRDP advertisement message.

Figure 9:
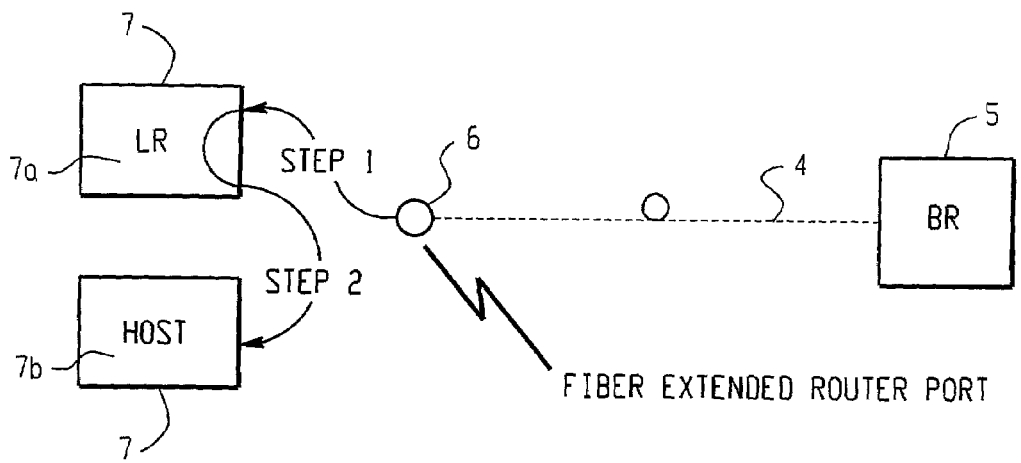
FIG. 9 is a schematic drawing of system operation during a transition period.

FIG. 9 illustrates the process the protocol engine 30 performs if the ARP database 52 does not reflect the current user LAN 3 subnet topology during transition periods (such as during a system boot-up). During such a period, the protocol engine 30 will send some downstream data packets to the LR 7a that were intended for hosts 7b on the directly attached subnet. The LR 7a, in turn, forwards the data packets to the proper hosts 7b. The transition periods, however, will be temporary because all hosts 7b are required to refresh their ARP tables.

In the downstream direction within the protocol engine 30, the VC agent 44 receives data packets at the VC port 42. The VC de-framer 43 strips off the overhead that was added for transmission across the virtual channel. The resulting IP packet is forwarded to the router agent 50. The router agent 50 forwards packets destined to LAN hosts 7b to the protocol mux 55 and IRDP messages to the IRDP agent. The protocol mux 55 forwards data packets to the Ethernet framer 49. The Ethernet framer 49 formats the data packet using the encapsulation format used on the LAN 3.

In the upstream direction, Ethernet data packets from the LAN 3 are read by the MAC filter 47. The protocol engine 30 discards data packets other than IP and ARP coming upstream. If the data packet is addressed to the protocol engine 30, the data packet is further processed. The MAC filter 47 strips off the Ethernet overhead and passes the resultant IP data packet to the VC framer 45 via the protocol demux 56 and the protocol mux 55. The VC framer 45 frames the data packet for transmission across the SONET/SDH network 10. Also, in the upstream direction, the Ethernet agent 46 via the encapsulation detector 48 snoops Ethernet data packets to determine the type of Ethernet encapsulation used on the LAN. The Ethernet encapsulation format information is shared with the Ethernet framer 49 so that the Ethernet framer 49 can properly frame Ethernet packets in the downstream path.

The protocol engine 30 of the present invention is capable of operation with a variety of different LAN configurations. For example, the protocol engine 30 can interface with a LAN router, which in turn interfaces with the LAN, as shown in FIG. 7a. Other examples include the use of the protocol engine 30 on a flat user LAN as shown in FIG. 7b and the protocol engine 30 interfacing with Proxy/NAT box and a mail gateway, the proxy/Nat box in turn interfacing with the user as shown in FIG. 7c. The present invention can also be used on other LAN configurations not shown.

Multiplexed Ethernet Ports

Figure 10:
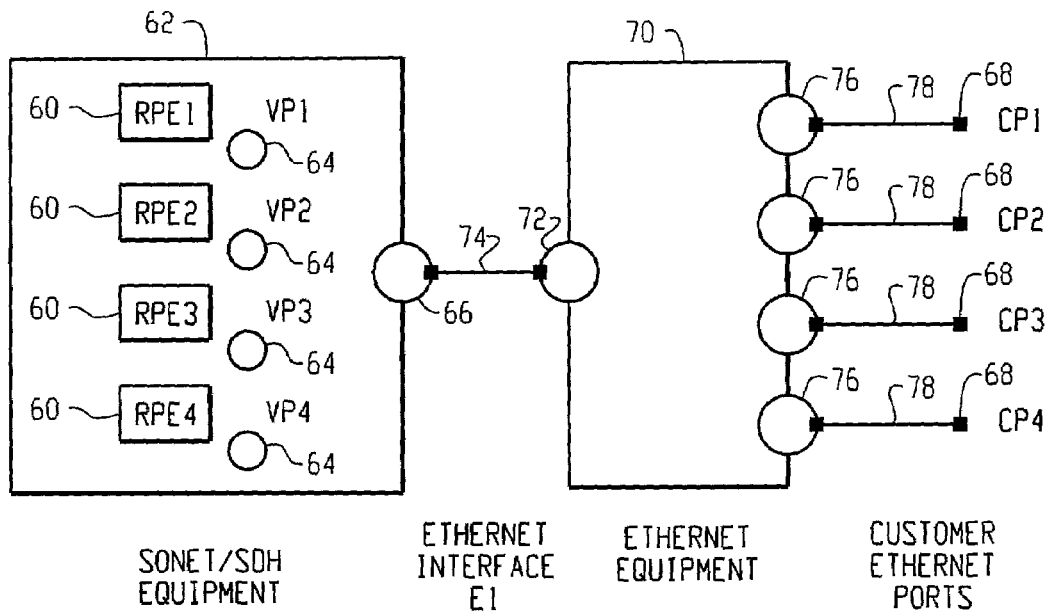
FIG. 10 is a diagram illustrating the connection of multiple user network via a single network node having a plurality of router port extension functional elements.

In another embodiment of the present invention, as shown in FIG. 10, SONET/SDH access equipment 62 is provided at a SONET/SDH network node for providing multiple customers with fiber extended router ports. The SONET/SDH access equipment 62 includes a plurality of multiple router port extension ("RPE") 60 functional units. Each RPE 60 is capable of establishing a separate virtual channel through the ring 10 and the concentrator interface of CC 16 to a sub-interface of BR 5. Each RPE 60 is operable to receive data packets from a sub-interface of BR 5 and to reformat those data packets to the format used on a connected LAN for forwarding to the LAN. The RPEs 60 are also operable to reformat data packets received from the connected LANs and to transmit the reformatted data packets over the ring 10 to a sub-interface of BR 5. In addition, each RPE 60 has an associated Virtual Port ("VP") 64. The RPEs 60 and their associated VPs 64 are multiplexed to a single Ethernet physical connection 66 for connection to multiple user or customer LANs.

Multiple customers are provided with a customer port ("CP") 68 at the customer's physical location preferably through the use of Ethernet equipment 70. The Ethernet Equipment 70 includes an Ethernet physical connection 72 for connection, preferably through an Ethernet cable 74, to the Ethernet physical connection 66 on the SONET/SDH access equipment 62. The Ethernet Equipment 70 further includes multiple customer physical connections 76 for connection, preferably via Ethernet cables 78, to CPs 68. The Ethernet Equipment 70 multiplexes multiple customers via Ethernet physical connection 72 to the Ethernet physical connection 66 on the SONET/SDH access equipment 62. The Ethernet equipment 70 preferably is an Ethernet switch with VLAN capabilities such as the CISCO Catalist switch or the 3 COM Superstack switch.

Figure 11:
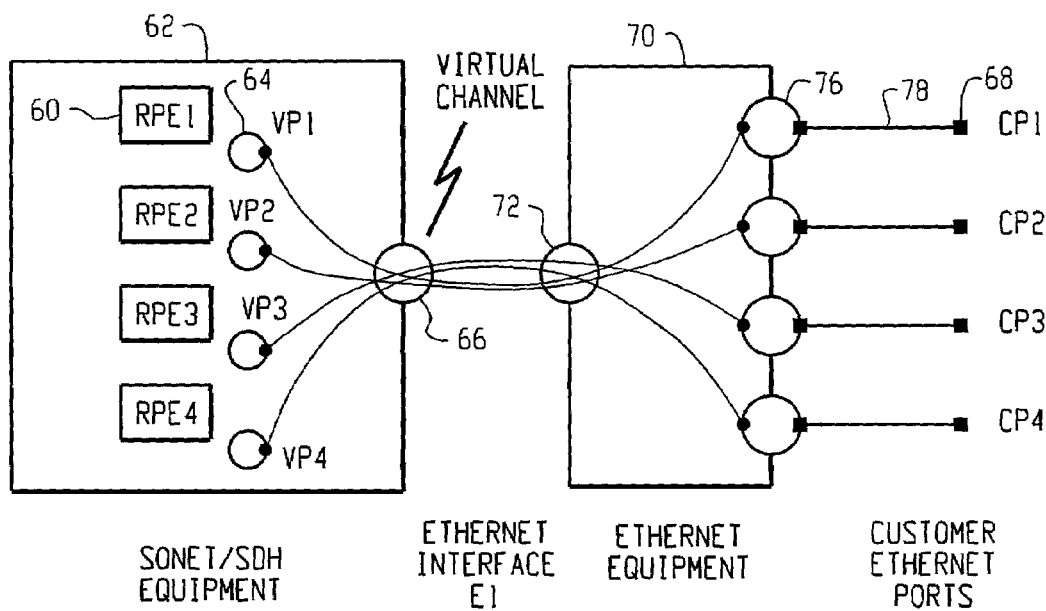
FIG. 11 is a diagram illustrating the use of virtual channels paths with a network node having a plurality of router port extension functional elements.

The present invention adds a VLAN to the router port extension thereby lowering the cost of the high speed link. Each customer has its own VLAN Id and is provided with a CP 68. Each CP 68 is mapped to a VP 64 and a RPE 60. Standard "VLAN tagging," as defined by IEEE802.1Q, and virtual channels are preferably used to map each particular customer traffic flow as illustrated in FIG. 11. Each VP 68 is addressable by a unique Ethernet MAC address for reaching the RPE service 60. Each RPE 60 has a unique IP address. The system preferably uses ARP protocol for binding.

Having described in detail the preferred embodiments of the present invention, including preferred modes of operation, it is to be understood that this invention and operation could be constructed and carried out with different elements and steps. The preferred embodiments are presented only by way of example and are not meant to limit the scope of the present invention, which is defined by the following claims.

What is claimed is:

1. A communication system for providing a plurality of user networks with a high speed link to a wide area network comprising:

a transport network having a plurality of network nodes coupled together by one or more data communication paths, wherein at least one of said network nodes comprises an access device and at least one of said network nodes comprises a concentrator device;

said access device including a plurality of router port extension functional units wherein each said router port extension functional unit is coupled to one of the user networks, said router port extension functional unit being operable to receive an upstream data packet from one of the user networks, operable to frame said received upstream data packet into a format compatible for transmission on said transport network, and operable to forward said converted upstream data packet onto at least one of said one or more data communication paths on said transport network, said router port extension functional unit also being operable to receive a downstream data packet from at least one of said one or more data communication paths on said transport network, operable to frame said received downstream data packet into a format compatible for receipt by said user network, and operable to forward said converted downstream data packet to said user network; and said concentrator device being coupled to a wide area network access device, said concentrator device being operable to receive network data packets from at least one of said data communication paths and operable to forward said received network data packets to said wide area network access device, said concentrator device also being operable to receive data packets from said wide area network access device and operable to forward said data packets from said wide area network access device to at least one of said data communication paths; wherein each of the router port extension functional units has an associated virtual port and wherein all of said virtual ports are multiplexed to a single LAN communication port.

2. The system according to claim 1 further comprising a LAN switch device, said LAN switch device having a first port for providing a coupling path to said LAN communication port of said access device, said LAN switch also having a plurality of customer LAN ports, each of said customer LAN ports being operable to provide a coupling point for a connection between one of the user LANs and one of the router port extension functional units.

3. The system according to claim 2 wherein said LAN switch device provides virtual channels between the user LANs and said router port extension functional units.

4. The system according to claim 2 wherein said LAN switch device provides a virtual LAN for providing a connection between the user LANs and said router port extension functional units.

5. The system according to claim 4 wherein each of said user LANs is provided with a unique virtual LAN identification number.

6. The system according to claim 1 wherein said router port extension functional units comprise:
a virtual channel agent that is operable to receive said downstream data packet from said transport network, said virtual channel agent also being operable to transmit said upstream data packet to said transport network; and
a LAN agent that is operable to receive said upstream data packet from the user network, said LAN agent also being operable to transmit said downstream data packet to the user network.

7. The system according to claim 6 wherein said virtual channel agent further comprises:
a virtual channel framer that is operable to frame said upstream data packet into a format that is compatible for transmission on said transport network; and
a virtual channel de-framer that is operable to remove a network encapsulation format from said downstream data packet that has been receive from said transport network.

8. The system according to claim 6 wherein said LAN agent further comprises:
a LAN framer that is operable to frame said downstream data packet into a frame format that is compatible for transmission to the user network;
an encapsulation detector that is operable to detect said frame format used by the user network to transfer data packets; and
a LAN filter that is operable to determine whether a received data packet is addressed to said router port extension functional unit.

9. The system according to claim 8 wherein said LAN agent is an Ethernet LAN agent, said LAN framer is an Ethernet framer and said LAN filter is a MAC filter.

10. The system according to claim 6 wherein said router port extension functional unit further comprises:
a router agent for routing data packets within said router port extension functional unit;
an address resolution agent that is operable to process ARP messages;
an address resolution database that is operable to store LAN addresses;
an IRDP (ICMP Router Discovery Protocol) agent that is operable to process IRDP (ICMP Router Discovery Protocol) messages; and
a RIP (Routing Information Protocol) agent that is operable to process RIP (Routing Information Protocol) messages.

11. The system according to claim 10 wherein said address resolution agent is an ARP agent that is operable to process ARP messages and said address resolution database is an ARP database that is operable to store LAN addresses.

12. The system according to claim 1 wherein said network is an optical network.

13. The system according to claim 1 wherein said network is a ring network.

14. The system according to claim 12 wherein said network is an hub and spoke network.

15. The system according to claim 13 wherein said ring network is a SONET or SDH ring.

16. A network node device for use in a transport network and for providing a plurality of user networks with an interface to the transport network, the network node device comprising a plurality of router port extension functional units, each router port extension functional unit being coupled to one of the user networks, each router port extension functional unit comprising:
a virtual channel agent that is operable to receive a first data packet from the transport network, said virtual channel agent also being operable to transmit a second data packet to the transport network; and
a LAN agent that is operable to receive said second data packet from the user network, said LAN agent also being operable to transmit said first data packet to the user network; wherein each of the router port extension functional units has an associated virtual port and wherein all of said virtual ports are multiplexed to a single LAN communication port.

17. The network node device according to claim 16 wherein said virtual channel agent comprises:
a virtual channel framer that is operable to frame said second data packet into a format that is compatible for transmission on the transport network; and
a virtual channel de-framer that is operable to remove a network encapsulation format from said first data packet.

18. The network node device according to claim 16 wherein said LAN agent comprises:
a LAN framer that is operable to frame said first data packet into a LAN frame format that is compatible for transmission to the user network;
an encapsulation detector that is operable to detect the LAN frame format used by the user equipment to transfer data packets; and
a LAN filter that is operable to determine whether a received data packet is addressed to the router port extension functional unit.

19. The network node device according to claim 18 wherein said LAN agent is an Ethernet LAN agent, said LAN framer is an Ethernet framer and said LAN filter is a MAC filter.

20. The network node device according to claim 16 wherein said router port extension functional unit further comprises:
a router agent for routing said first and said second data packets within the router port extension functional unit;
an address resolution agent that is operable to process ARP messages;
an address resolution database that is operable to store LAN addresses;
an IRDP (ICMP Router Discovery Protocol) agent that is operable to process IRDP (ICMP Router Discovery Protocol) messages; and
a RIP (Routing Information Protocol) agent that is operable to process RIP (Routing Information Protocol) messages.

21. The network node device according to claim 20 wherein said address resolution agent is an ARP agent that is operable to process ARP messages and said address resolution database is an ARP database that is operable to store LAN addresses.

22. A transport network access system for use in a transport network and for providing a plurality of user networks with an interface to the transport network, the network access system comprising a plurality of router port extension functional units, each router port extension functional unit being coupled to one of the user networks, each router port extension functional unit comprising:
a virtual channel agent that is operable to receive a first data packet from the transport network, said virtual channel agent also being operable to transmit a second data packet to the transport network; and a LAN agent that is operable to receive said second data packet from the user network, said LAN agent also being operable to transmit said first data packet to the user network; wherein each of the router port extension functional units has an associated virtual port and wherein all of said virtual ports are multiplexed to a single LAN communication port.

23. The system according to claim 22 further comprising a LAN switch device, said LAN switch device having a first port for providing a coupling path to said LAN communication port of said access device, said LAN switch also having a plurality of customer LAN ports, each of said customer LAN ports being operable to provide a coupling point for a connection between one of the user LANs and one of the router port extension functional units.

24. The system according to claim 23 wherein said LAN switch device provides virtual channels between the user LANs and said router port extension functional units.

25. The system according to claim 23 wherein said LAN switch device provides a virtual LAN for providing a connection between the user LANs and said router port extension functional units.

26. The system according to claim 25 wherein each of said user LANs is provided with a unique virtual LAN identification number.

27. The system according to claim 22 wherein said virtual channel agent further comprises:

a virtual channel framer that is operable to frame said upstream data packet into a format that is compatible for transmission on said transport network; and a virtual channel de-framer that is operable to remove a network encapsulation format from said downstream data packet that has been receive from said transport network.

28. The system according to claim 22 wherein said LAN agent further comprises:

a LAN framer that is operable to frame said downstream data packet into a frame format that is compatible for transmission to the user network;

an encapsulation detector that is operable to detect said frame format used by the user network to transfer data packets; and a LAN filter that is operable to determine whether a received data packet is addressed to said router port extension functional unit.

29. The system according to claim 28 wherein said LAN agent is an Ethernet LAN agent, said LAN framer is an Ethernet framer and said LAN filter is a MAC filter.

30. The system according to claim 22 wherein said router port extension functional unit further comprises:

a router agent for routing data packets within said router port extension functional unit;

an address resolution agent that is operable to process ARP messages;

an address resolution database that is operable to store LAN addresses;

an IRDP (ICMP Router Discovery Protocol) agent that is operable to process IRDP (ICMP Router Discovery Protocol) messages; and a RIP (Routing Information Protocol) agent that is operable to process RIP (Routing Information Protocol) messages.

31. The system according to claim 30 wherein said address resolution agent is an ARP agent that is operable to process ARP messages and said address resolution database is an ARP database that is operable to store LAN addresses.

32. The system according to claim 22 wherein said transport network is an optical network.

33. The system according to claim 22 wherein said transport network is a ring network.

34. The system according to claim 22 wherein said transport network is an hub and spoke network.

35. The system according to claim 33 wherein said ring network is a SONET or SDH ring.

36. A method for use with a transport network access system comprising a plurality of router port extension functional units, the transport network access system being coupled to a transport network, each router port extension functional unit being coupled to one of a plurality of user networks, each router port extension functional unit comprising (a) a virtual channel agent that is operable to receive a first data packet from the transport network, the virtual channel agent also being operable to transmit a second data packet to the transport network, and (b) a LAN agent that is operable to receive said second data packet from the user network, the LAN agent also being operable to transmit said first data packet to the user network, the method comprising the steps of:

receiving, with the LAN agent, an upstream data packet from the user equipment;

encapsulating, with the router port extension functional unit, said received upstream data packet into an encapsulation format that is compatible for transmission on said network; and routing, with the virtual channel agent, said encapsulated data packet onto at least one of a plurality of data communication paths on the transport network for further transmission to a wide area network access device; wherein each of the router port extension functional units has an associated virtual port and wherein all of said virtual ports are multiplexed to a single LAN communication port.

37. The method of claim 36 further comprising the steps of:

receiving, with the virtual channel agent, a downstream data packet from at least one of said plurality of data communication paths on said transport network;

encapsulating, with the router port extension functional unit, said received downstream data packet into an encapsulation format that is compatible for receipt by the user LAN; and routing, with the LAN agent, said encapsulated downstream data packet to said user LAN.

38. The method of claim 37 wherein said user LAN interface is an Ethernet LAN.

39. The method of claim 36 wherein said received upstream data packet is an Ethernet format data packet.

40. The method of claim 36 wherein said transport network is a SONET or SDH ring and said encapsulating step comprises the step of encapsulating said received upstream data packet into a SONET or SDH format data packet.

41. The method of claim 36 wherein said routing step comprises the step of adding said encapsulated data packet to a virtual channel in the network.

42. The method of claim 37 wherein said network is a SONET or SDH ring and said downstream data packet is a SONET or SDH format data packet.

43. The method of claim 42 wherein said encapsulating said received downstream data packet step includes the step of removing a network encapsulation format from said received downstream data packet.

44. The method of claim 42 wherein said encapsulating said received downstream data packet step further includes the step of encapsulating said received downstream data packet into an Ethernet format data packet.

45. The method of claim 42 wherein said encapsulating said received downstream data packet step includes the steps of removing a network encapsulation format from said downstream data packet thereby de-framing said data packet and encapsulating said de-framed data packet into an Ethernet format data packet.

46. The method of claim 36 wherein said network is an optical network.

47. The method of claim 36 wherein said network is a ring network.

48. The method of claim 47 wherein said network is an IP ring network.

49. The method of claim 47 wherein said ring network is a SONET or SDH network.

50. A method for extending a plurality of sub-interfaces of a router port of a wide area network access device to a plurality of user networks using a transport network comprising a plurality of network nodes coupled together by one or more data communication paths, wherein at least one of said network nodes comprises an access device, the access device including a plurality of router port extension functional units wherein each router port extension functional unit is coupled to one of the user networks, each router port extension functional unit comprising (a) a virtual channel agent and (b) a LAN agent, wherein each of the router port extension functional units has an associated virtual port and wherein all of said virtual ports are multiplexed to a single LAN communication port, the method comprising the steps of:

receiving, with the virtual channel agent of a first router port extension functional unit, a downstream data packet from the router port;

decapsulating, in said first router port extension functional unit, said received downstream data packet so that the transport network encapsulation format is removed from said received data packet;

transmitting, with the LAN agent of the first router port extension functional unit, an ARP message over a first user LAN requesting the address for the recipient of the received downstream data packet;

receiving, with the LAN agent of the first router port extension functional unit, an ARP response from a device on the first user LAN;

encapsulating, in the first router port extension functional unit, the decapsulated data packet into a LAN encapsulation format data packet using the address received from the ARP response as the destination address for the data packet;

transmitting, with the LAN agent of the first router port extension functional unit, the LAN encapsulated data packet onto said first user LAN; and repeating the foregoing steps with a second user LAN using a second router port extension functional unit.

51. The method of claim 50 further comprising the following steps:

listening to, with the first router port extension functional unit, messages traveling across the first LAN;

determining, in the first router port extension functional unit, the encapsulation format used for data packets on the first LAN;

using, in the first router port extension functional unit, the determined encapsulation format type when encapsulating data packets for transmission onto the first LAN; and repeating the foregoing steps with a second user LAN using a second router port extension functional unit.

52. The method according to claim 50 wherein a LAN switch device having a first port is coupled to the LAN communication port of the access device via the first port, said LAN switch also having a plurality of customer LAN ports, each of said customer LAN ports being operable to provide a coupling point for a connection between one of the user LANs and one of the router port extension functional units.

53. The system according to claim 52 wherein said LAN switch device provides virtual channels between the user LANs and said router port extension functional units.

54. The system according to claim 52 wherein said LAN switch device provides a virtual LAN for providing a connection between the user LANs and said router port extension functional units.

55. The system according to claim 54 wherein each of said user LANs is provided with a unique virtual LAN identification number.

56. A method for extending a plurality of sub-interfaces of a router port of a wide area network access device to a plurality of user networks using a transport network comprising a plurality of network nodes coupled together by one or more data communication paths, wherein at least one of said network nodes comprises an access device, the access device including a plurality of router port extension functional units wherein each router port extension functional unit is coupled to one of the user networks, each router port extension functional unit comprising (a) a virtual channel agent and (b) a LAN agent, wherein each of the router port extension functional units has an associated virtual port and wherein all of said virtual ports are multiplexed to a single LAN communication port, the method comprising the steps of:

receiving, with the LAN agent of a first router port extension functional unit, a first upstream data packet from a first user LAN;

decapsulating, in the first router port extension functional unit, said received first data packet so that the LAN encapsulation format is removed from said received first data packet;

encapsulating, in the first router port extension functional unit, the first decapsulated data packet into the transport network encapsulation format;

transmitting, with the virtual channel agent of the first router port extension functional unit, the first transport network encapsulated data packet onto the transport network; and repeating the foregoing steps with a second user LAN using a second router port extension functional unit.

* * * * *